Dec. 11, 1928.
V. G. APPLE
1,694,464
METHOD OF MAKING AN ARMATURE
Filed Dec. 1, 1927   3 Sheets-Sheet 1
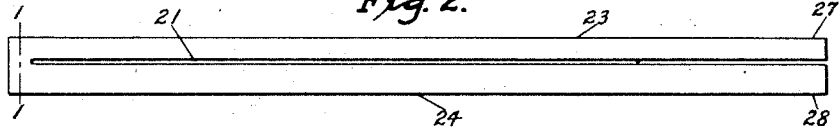
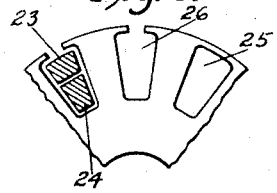
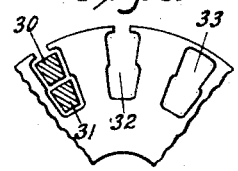
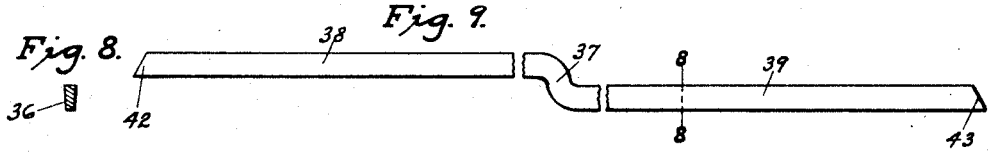
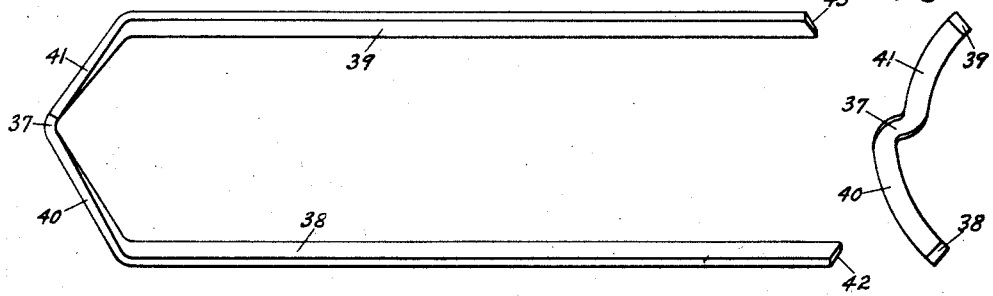
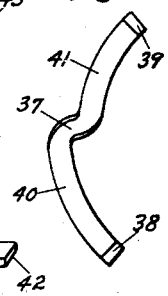
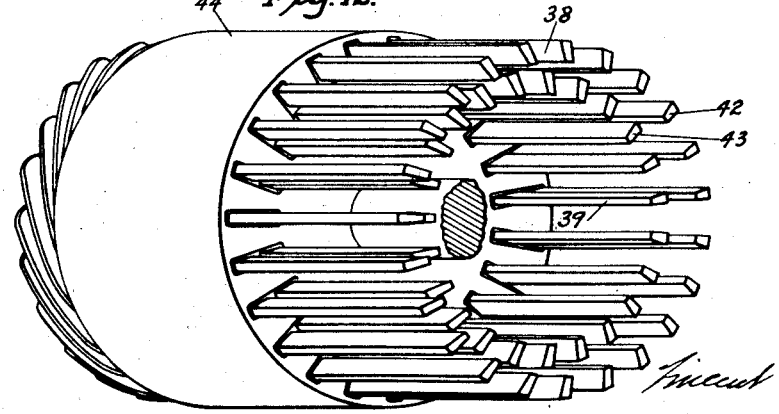
INVENTOR.
Vincent G. Apple Dec. 11, 1928.
V. G. APPLE
1,694,464
METHOD OF MAKING AN ARMATURE
Filed Dec. 1, 1927   3 Sheets-Sheet 2
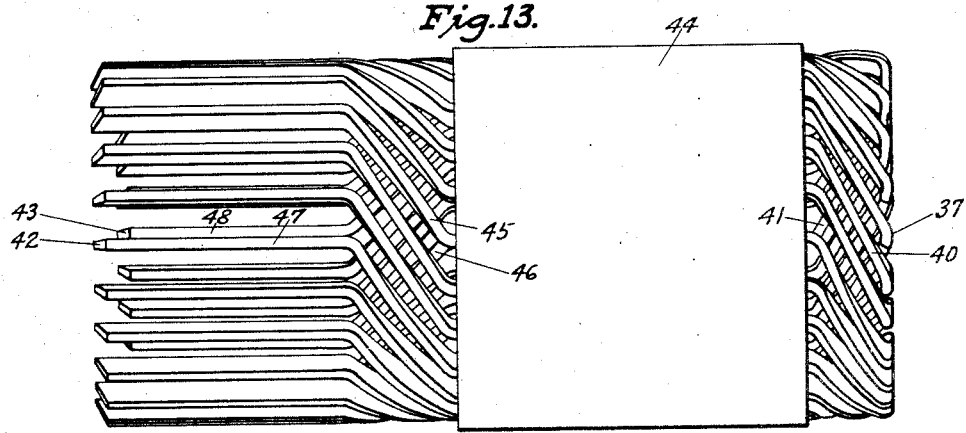
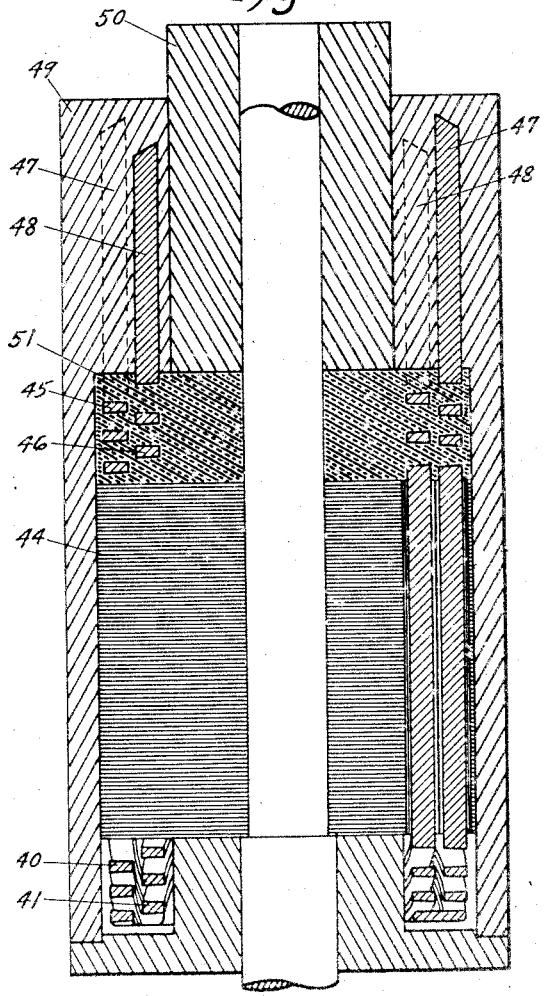
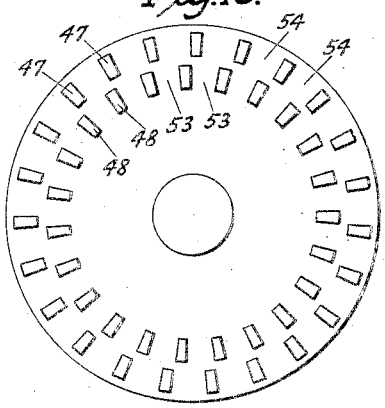
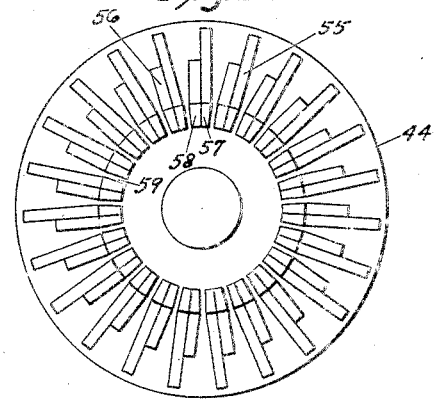
INVENTOR.

Dec. 11, 1928.
V. G. APPLE
1,694,464
METHOD OF MAKING AN ARMATURE
Filed Dec. 1, 1927    3 Sheets-Sheet 3
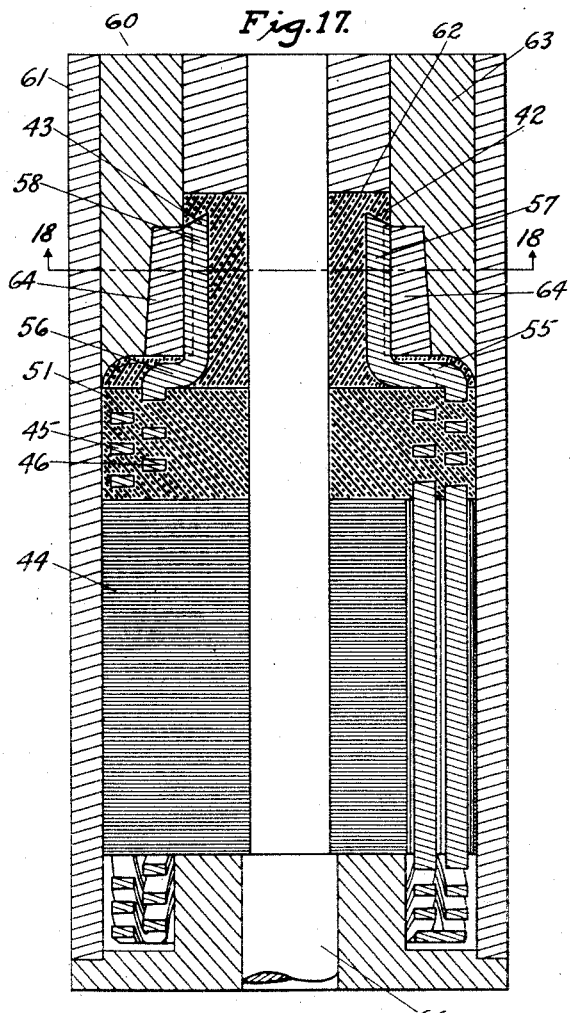
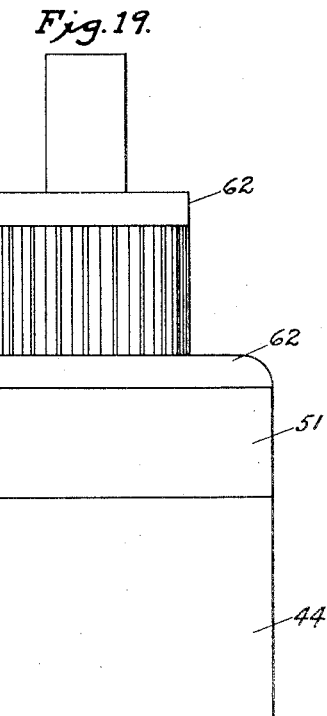
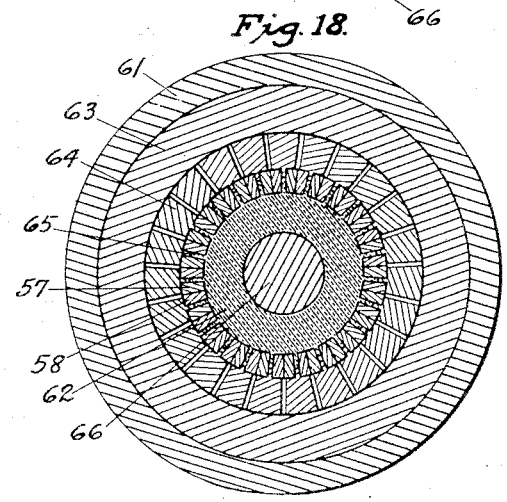
INVENTOR.
Vincent G. Apple Patented Dec. 11, 1928.

1,694,464

UNITED STATES PATENT OFFICE.

VINCENT G. APPLE, OF DAYTON, OHIO.

METHOD OF MAKING AN ARMATURE.

Application filed December 1, 1927. Serial No. 237,035.

My invention relates to single turn bar-wound armatures and more especially to those in which the bars of the winding are endwise entered thru the winding apertures of a core.
An object of my invention is to provide a better armature more cheaply by substituting for the separately made commutator usually soldered to the bars of the winding a commutator made by appropriately disposing the ends of the bars after they have been endwise entered thru the winding apertures.

Another object is to provide cores having winding apertures of certain width and cross-sectional contour and bars of such cross sectional contour as will substantially fill said apertures when placed one radially above the other therein, and will compose commutator segments of suitable thickness when placed one circumferentially adjacent to the other, and a method of assembling said bars and core to compose an armature.

Further objects will appear from the following description reference being had to the drawings wherein—

Fig. 1 is a cross section taken thru bar stock which I may use to provide units of my winding.

Fig. 2 shows a length of bar stock split to provide two legs of a winding loop.

Fig. 3 shows bar Fig. 2 assembled in a suitable core aperture.

Fig. 4 shows how the two legs of bar Fig. 2 are paired to compose a commutator segment.

Fig. 5 is a cross secton thru a form of wire which I may use for a turn of my winding.

Fig. 6 shows the two wires Fig. 5 one radially above the other in a suitable core aperture.

Fig. 7 shows how two wires Fig. 5 may be paired to compose a commutator segment.

Fig. 8 is a cross section thru a form of wire most often used for my winding.

Fig. 9 shows how I offset a length of wire Fig. 8.

Fig. 10 is a plan view of a loop bent from wire Fig. 9.

Fig. 11 is an end view of a loop Fig. 10.

Fig. 12 shows a plurality of loops Fig. 10 assembled in a core.

Fig. 13 shows the armature after front leads are formed by bending the loop ends.

Fig. 14 shows a mold wherein insulation is molded about the front leads.

Fig. 15 shows an end view of my armature after it is removed from mold Fig. 14.

Fig. 16 shows an end view of my armature after the two layers of wires are offset to bring the ends of one layer into the spaces between the ends of the other layer.

Fig. 17 shows a mold wherein a second molding operation takes place.

Fig. 18 is a horizontal cross section thru mold Fig. 17.

Fig. 19 shows a completed armature.

Similar numerals refer to similar parts thruout the several views.

In many instances armature cores having closed or partially closed winding apertures are to be preferred, not only because they hold bars of the winding more firmly against the action of centrifugal force, but also because where such apertures are used there is left a greater area of the core material at its outer diameter over which the magnetic flux may distribute itself, thus lessening the flux density and consequent-reluctance in the air gap between the armature and its field. In the drawings closed and semiclosed apertures are shown tho open apertures may be used if desired.

The smaller the number of segments in a commutator the more wedge shaped is the cross section of a segment, while in cases where the commutator has a very large number of segments the cross section of a segment becomes substantially rectangular. Because of this diversity in design considerable variation in the manner of carrying out my invention results. Accordingly, when the number of commutator segments is very small, I may take a length of bar stock of a cross section 20 Fig. 1 and split it lengthwise as at 21 Fig. 2 thus providing a conductor bar 23 of the outer layer of the winding and a conductor bar 24 of the inner layer of the winding, both conductor bars being of substantially equal cross-sectional area but bar 24 being thinner and wider than bar 23, and assemble these bars in pairs one radially above the other in a wedge shaped winding aperture of the character shown at 25 or 26 Fig. 3 and afterward arrange the ends 27 and 28 in pairs as shown in Fig. 4 to compose a commutator segment of each such pair.

Another way to satisfy a condition similar to the foregoing is to provide bar stock or wire of a cross section 29 Fig. 5 and form loops therefrom, the legs 30 and 31 of which are assembled one above the other in a core aperture 32 or 33 Fig. 6, while the ends of the legs are paired as at 34 and 35 Fig. 7 to form commutator segments.

In the majority of armatures, however, the number of commutator bars is so large that their cross sectional contour is but slightly wedge shaped, and such bars may consequently be used in rectangular winding apertures with little waste of space therein. To wind such an armature I provide slightly wedge shaped wire of a cross section 36 Fig. 8, offset it as at 37 Fig. 9 then bend it to loop form as shown in plan view Fig. 10 and end view Fig. 11. The loop has two parallel conductor bars 38 and 39 joined together at 37 by diagonal back leads 40 and 41. When these loops are assembled in a core the offset 37 locates bar 38 further away from the core axis than bar 39 so that a plurality of bars 38 may form the outer layer of the winding and an equal number of bars 39 may form the inner layer of the winding. The ends of the bars are beveled as at 42 and 43 for reasons which will hereinafter appear.

When a sufficient number of loops are available they are assembled in cylindrical formation and endwise entered in a core 44 as shown in Fig. 12, where the free ends of the loops extend thru and beyond the core in two concentric layers. The process by which the loops are the assembled with the core is preferably that shown in my Patent No. 1,555,931.

The two concentric rows of extending ends are next bent to form diagonal front lead portions 45 and 46 leaving portions 47 and 48 of said ends still extending parallel to the core axis and still arranged in two concentric rows as shown in Fig. 13. This bending may be conveniently done in either of my machines Patents No. 1,332,154 and 1,544,623.

The structure is now placed in a mold Fig. 14, the body portion 49 of which is bored to receive core 44, leaving space around the diagonal front leads 45 and 46. A plurality of pockets extend upwardly into body 49 to receive straight ends 47 and 48 of the conductor bars. A plunger 50 may close the upper portion of the mold. Insulation 51 is then molded between and about diagonal front leads 45 and 46. Any insulation having the required dielectric and mechanical strength may be used. It may be poured or pumped into place while fluid, or placed in the mold in granular form, rendered mobile by heat or otherwise, compacted by plunger 50, and hardened by whatever process the nature of the insulation requires.

An end view of the armature after it has been removed from mold Fig. 14 is shown in Fig. 15, where it appears that, due to a proper predetermination of the length and direction of front leads 45 and 46, the axially parallel ends 47 are not radially over axially parallel ends 48, but that an end 47 is in each case over one of the spaces 53 left between ends 48 of the inner layer. To make a commutator segment by bringing an end 47 circumferentially adjacent and in electrical contact with an end 48, it is then necessary to displace ends 47 into spaces 53 between ends 48 or to displace ends 48 into spaces 54 between ends 47, or, both rows of ends may be displaced inwardly or both outwardly, depending upon what diameter commutator is desired and upon how much space may be allowed between segments. Usually, as in the present case, the ends of the bars are radially displaced as shown in Fig. 16, where portions 55 of ends 47 and portions 56 of ends 48 extend radially inward to a suitable commutator diameter when all of the bars are again bent to provide new axially parallel ends 57 and 58 which are paired as shown to form commutator segments, said segments having spaces 59 therebetween. No tool is herein shown to radially displace ends 47 and 48, it being considered within the skill of an ordinary mechanic to provide one suitable for the purpose.

The armature is now placed in a second mold 60, (see Fig. 17) the body portion 61 of which is bored to receive core 44 and the previously molded portion 51, leaving space between and about the bent portions 55 and 56 of the conductors, within and between the bars 57 and 58 and about their beveled ends 42 and 43. Insulation 62 is then molded into the spaces so left within the mold as shown.

While in the foregoing description and drawings two separate molding operations are indicated, it will be understood that the first molding operation is performed separately, and prior to the second merely so that the diagonal portion of the two concentric rows of bars may be held in statu quo while radial displacement of the bar ends is being effected. A method, therefore, comprising other means to so hold these bars, and which thereby eliminates the first molding operation, is considered within the spirit of the invention.

A horizontal cross section thru mold 60 is shown in Fig. 18. Here a ring 63 is forced over jaws 64, each jaw having a small spacing tang 65 extending between commutator segments composed of pairs of bars 57 and 58. The radially inward pressure of jaws 64 holds the flat sides of pairs of bars 57 and 58 in electrical contact and holds the pairs of lugs spaced apart so that insulation 62 may be molded to surround shaft 66 and to extend outwardly between segments as far as tangs 65 of jaws 64 will permit. Each commutator segment comprises a bar 57 and a bar 58 held in electrical contact by the mass of molded insulation 62 (see Fig. 17).

As previously pointed out, when the number of bars in the commutator is large the cross section of the stock used is nearly rectangular, and while a more nearly perfect commutator may be made if stock of appropriate wedge shape is used, where the number of bars is very large stock that is wholly rectangular may be employed, or, under these circumstances, rectangular stock may be formed into loops and the ends which later form layers of the commutator ring may be pressed to a slight wedge shape, so long as the stock is not thereby widened sufficiently to prevent a pair of such ends one radially above the other being endwise entered thru a winding aperture.

While I have described several forms of loops suitable for the purpose of carrying out my invention and indicated several methods whereby they may be made, any form of loop will answer the purpose, however it is produced if it has bars which would substantially fill a winding aperture when placed one radially above the other, said bars being also of such size and form that if brought one circumferentially adjacent to the other they would together form a suitable commutator segment, the invention residing not in the bar as such, but rather in the method of making an armature therefrom.

A completed armature is shown in Fig. 19 where insulation 62 holds the commutator segments in place and insulation 51 covers and holds the diagonal front leads 45 and 46. Obviously the back leads 40 and 41 may be similarly covered and held if desired, tho for the sake of economy such covering is here omitted.

Having illustrated and described a procedure by which the objects of my invention are attained, I claim—

1. A method of making an armature which consists of providing a core having longitudinally extending winding apertures, providing a plurality of winding loops of the character herein described, endwise entering the loops into the core apertures until their open ends extend thru and beyond the core in two concentric rows, circumferentially displacing the end portion of each bar relative to the position contained in a core aperture, leaving the end portions connected to the aperture portions by diagonal portions, molding a mass of insulating material thru and about the diagonal portions to hold them against displacement, radially displacing the end portions of the bars relative to the diagonal portions to bring the ends of the bars of one of the concentric rows into the spaces between the ends of the bars of the other concentric row to provide one cylindrical row composed of circumferentially adjacent ends of bars, holding adjoining ends of bars together in pairs and the pairs spaced apart, and molding insulating material between and about the ends to form a segment from each pair of ends and a commutator from said segments.

2. A method of making an armature which consists of providing a core having longitudinally extending winding apertures, providing a plurality of winding loops of the character herein described, endwise entering the loops into the core apertures until their open ends extend thru and beyond the core in two concentric rows, circumferentially displacing the end portion of each bar relative to the portion contained in a core aperture, leaving the end portions connected to the aperture portions by diagonal portions, holding the diagonal portions against radial displacement so that end portions may be radially displaced relative thereto, radially displacing said end portions of the bars relative to the diagonal portions to bring the ends of the bars of one of the concentric rows into the spaces between the ends of the bars of the other concentric row to provide one cylindrical row composed of circumferentially adjacent ends of bars, holding adjoining ends of bars together in pairs and the pairs spaced apart, and molding insulating material between and about the bars to form a segment from each pair of ends and a commutator from said segments.

3. A method of making an armature which consists of providing a core having a plurality of winding apertures, providing a plurality of winding loops of the character herein described, entering the loops into the core apertures so that their open ends extend from the core in two concentric rows, circumferentially displacing the end portion of the bars relative to the portion contained in the core apertures, leaving the end portions connected to the aperture portions by diagonal portions, holding diagonal portions against displacement so that end portions may be radially displaced relative thereto, radially displacing said end portions of the bars relative to the diagonal portions to bring the ends of the bars of one of the concentric rows into the spaces between the ends of the bars of the other concentric row to provide one cylindrical row composed of circumferentially adjacent ends of bars, binding together adjoining ends of bars in pairs to compose commutator segments and the segments together to compose a commutator.

In testimony whereof I hereunto subscribe my name.

VINCENT G. APPLE.